United States Patent

Glorioso, Jr.

[11] Patent Number: 5,815,937
[45] Date of Patent: Oct. 6, 1998

[54] LEVEL ADAPTER ASSEMBLY

[76] Inventor: John R. Glorioso, Jr., 24 Dover Dr., Whitinsville, Mass. 01588

[21] Appl. No.: 647,473

[22] Filed: May 9, 1996

[51] Int. Cl.[6] .................................................. G01C 9/00
[52] U.S. Cl. .............................................. 33/370; 33/372
[58] Field of Search ............................ 33/370, 371, 451, 33/194, 404, 407, 408, 410, 372, 373

[56] References Cited

U.S. PATENT DOCUMENTS

| | | | |
|---|---|---|---|
| 1,545,932 | 7/1925 | Williams . | |
| 2,531,563 | 11/1950 | Feldheim | 248/226 |
| 2,624,118 | 1/1953 | Anderson | 33/370 |
| 2,638,134 | 5/1953 | Kearney | 143/86 |
| 2,915,273 | 12/1959 | Gavrun, Sr. | 33/373 |
| 3,230,632 | 1/1966 | Redding | 33/207 |
| 3,266,155 | 8/1966 | Staub | 33/370 |
| 4,066,232 | 1/1978 | Hermeyer | 248/226.2 |
| 4,589,213 | 5/1986 | Woodward | 33/371 |
| 4,739,561 | 4/1988 | Mills | 33/370 |
| 5,088,205 | 2/1992 | Egbert | 33/371 |

FOREIGN PATENT DOCUMENTS 208 954   6/1962   Sweden .................................. 33/371

*Primary Examiner*—Leslie A. Braun
*Assistant Examiner*—Gwendolyn W. Baxter
*Attorney, Agent, or Firm*—Cesari and McKenna, LLP

[57] ABSTRACT

An adapter assembly for positioning a level on a structural component includes a mounting mechanism that attaches to the level and an arm that is pivotally mounted on the mounting mechanism. The arm supports at one end a gripping mechanism, such as a bar, that extends outwardly in parallel to the axis of rotation about which the arm pivots. A spring extends between the arm and the mounting mechanism. To attach the level to a structural component a user pivots the arm to draw the gripping bar away from the level. The user then positions the level and the gripper bar on opposite surfaces of the structural component, and releases the arm. The spring draws the arm against one surface of the structural component and holds it in position, to clamp the level to the opposing surface of the structural component. The mounting mechanism may include a pivotally mounted bracket that pivots about a second axis of rotation. The bracket pivots the arm 90° relative to the surface of the level on which the arm is mounted, so that the level can be positioned in an alternative orientation against the surface of the structural component.

23 Claims, 4 Drawing Sheets

LEVEL ADAPTER ASSEMBLY

FIELD OF THE INVENTION

This invention relates generally to levels and, more particularly, to devices that position the level on a structural component to be vertically and/or horizontally oriented.

BACKGROUND OF THE INVENTION

Levels are used in every facet of construction, remodeling, and renovating, to ensure that structural components, such as beams, partitions, supports, shelves, and so forth are installed fully horizontally or vertically, as appropriate.

Often two people work together, for example, to construct shelving. One person positions a vertical support and the other holds the level against the support and directs how the support should be adjusted so that it stands at a full vertical. The support is then rigidly installed. When two such vertical supports are in place, one person next positions a shelf between the supports and the other person holds the level against the shelf and directs how bracketing for the shelf should be adjusted to ensure that the shelf is positioned fully horizontally.

If one person is installing the shelving, the installation process is more complicated and time consuming. The installer must (i) position a vertical support, (ii) hold the support in place and reach for the level, (iii) hold the level against the support and determine if the support is fully vertical, (iv) put the level down, (v) adjust the support, as necessary (vi) again pick up the level while holding the support in place, (vii) hold the level against the support to determine if the support is vertical, and so forth until the vertical support is properly oriented. The person then rigidly installs the support, and repeats the iterative process for each additional support, and for each shelf.

There are various devices that can be used to avoid such multi-step installation procedures for certain, specific tasks. For example, a person installing a fence post may use a device, such as the level holder described in U.S. Pat. No. 2,915,273 to attach a level to the fence post. The installer can then watch the movement of the various bubbles in the level as he or she adjusts the orientation of the post to a full vertical. While this particular level holder may work with the fence posts, it does not work with objects that have other shapes and sizes, for example, doors, shelves and so forth.

SUMMARY OF THE INVENTION

The invention is an adapter assembly that attaches to a conventional level and allows the level to be removably mounted vertically or horizontally to a surface of, for example, a door, a shelf, a beam, a pipe and so forth. The user can then appropriately orient the structural component on which the level is mounted, by observing the position of the bubbles in the windows of the attached level.

The adaptor assembly has essentially two parts, a pivotable arm that pivots about a bracket and a mounting mechanism for mounting the bracket, and thus, the arm to the level. One end of the arm supports a gripper bar that extends parallel to the pivot, and the other end of the arm supports a handle. To attach the level to a structural component, for example, to a door, the user depresses the handle to draw the gripper bar away from the level and create an opening that is slightly wider than the thickness of the door. The user then positions the level and the gripper bar on opposite surfaces of the door, and releases the handle. As the handle is released, a spring rotates the arm to bring the gripper bar into engagement with door. This clamps the level against the opposite surface of the door.

To remove the level from the door the user depresses the handle, to pivot the spring-loaded arm and attached gripper bar out of engagement with the surface of the door. Thereafter, the user pulls the level away from the door, and releases the handle. The spring then rotates the arm, bringing it to rest against the level.

The assembly-mounting mechanism includes a mounting plate and a base plate that are positioned on the top and bottom faces of the level. The plates are fastened together with mounting screws that extend through holes in the level. The bracket about which the arm pivots is itself pivotally mounted on the base plate, so that the bracket can be rotated to a 90° angle relative to the base plate.

When the assembly is used to position the level so that the front surface of the door can be vertically oriented, the side of the level rests against the front of the door, the gripper bar engages the back surface of the door and the bracket is rotated to the 90° angle such that the arm rests against the end surface of the door. To re-position the level so that the end surface of the door can be oriented vertically, the assembly holds the face of the level on which the arm is mounted against or parallel to the front surface of the door, and the gripper arm again engages the back surface of the door. The bracket, however, is perpendicular to the base plate, such that the arm again rests against the end surface of the door.

A preferred embodiment of the adapter assembly includes an additional bubble window that extends outwardly from and is perpendicular to the base plate. In the example of positioning the level to orient the front surface of the door vertically, the additional bubble window simultaneously vertically orients the end surface of the door. Thus, there is no need to re-position the level, as discussed above.

The adapter assembly may be used to position the level to orient the door horizontally, by clamping the level around the top or the bottom of the door.

The adapter assembly may also be used to hold the level off of the floor, when the level is not in use. This may be done by clamping the level to a beam, wall or other structural component that was previously installed. Storing the level in this manner avoids breakage that may occur when a level which is stored by propping against a wall, falls over. Further, storing the level off of the floor prevents the level from being inadvertently stepped on when, for example, it gets covered-up by construction materials.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
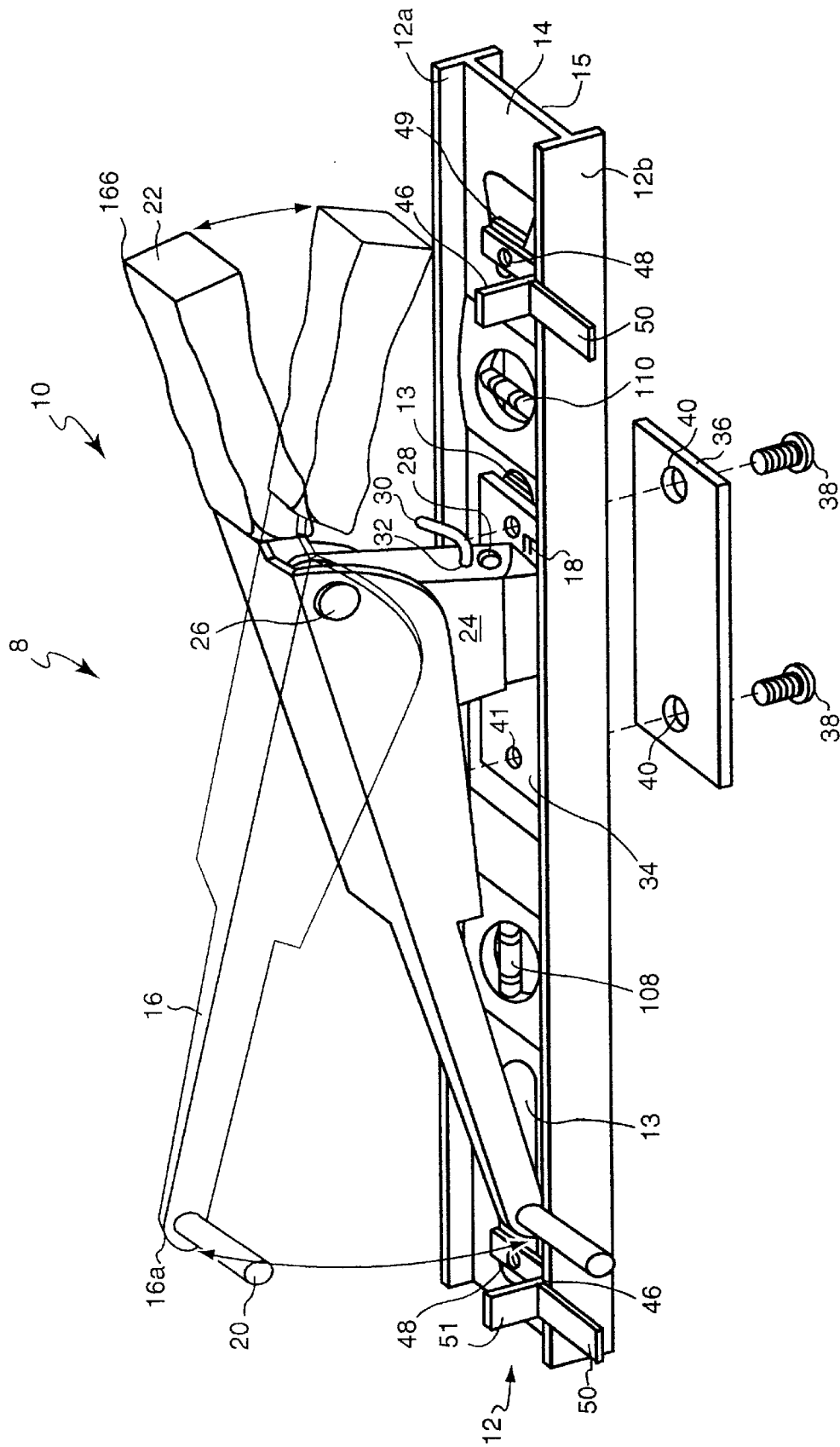
FIG. 1 depicts a first embodiment of the level adaptor assembly mounted on a conventional level.

FIG. 1 depicts a hands-free level system 8. The system 8 consists of a level adaptor assembly 10 that mounts onto a face 14 of a conventional level 12. The adaptor assembly 10 includes an arm 16 that is pivotally mounted on a bracket 24, such that the arm rotates about a pivot pin 26. The arm 16 supports at a first end 16a a gripper bar 20 that extends parallel to the pivot pin 26. At the opposite end 16b, the arm supports a handle 22. When the handle 22 is depressed, the end 16a of the arm, and thus, the gripper bar 20, moves away from the level 12 to create an opening. When the handle 22 is released, a spring 146 (FIG. 3) rotates the arm 16 in the opposite direction and brings the gripper bar 20 to rest against the level.

Figure 2:
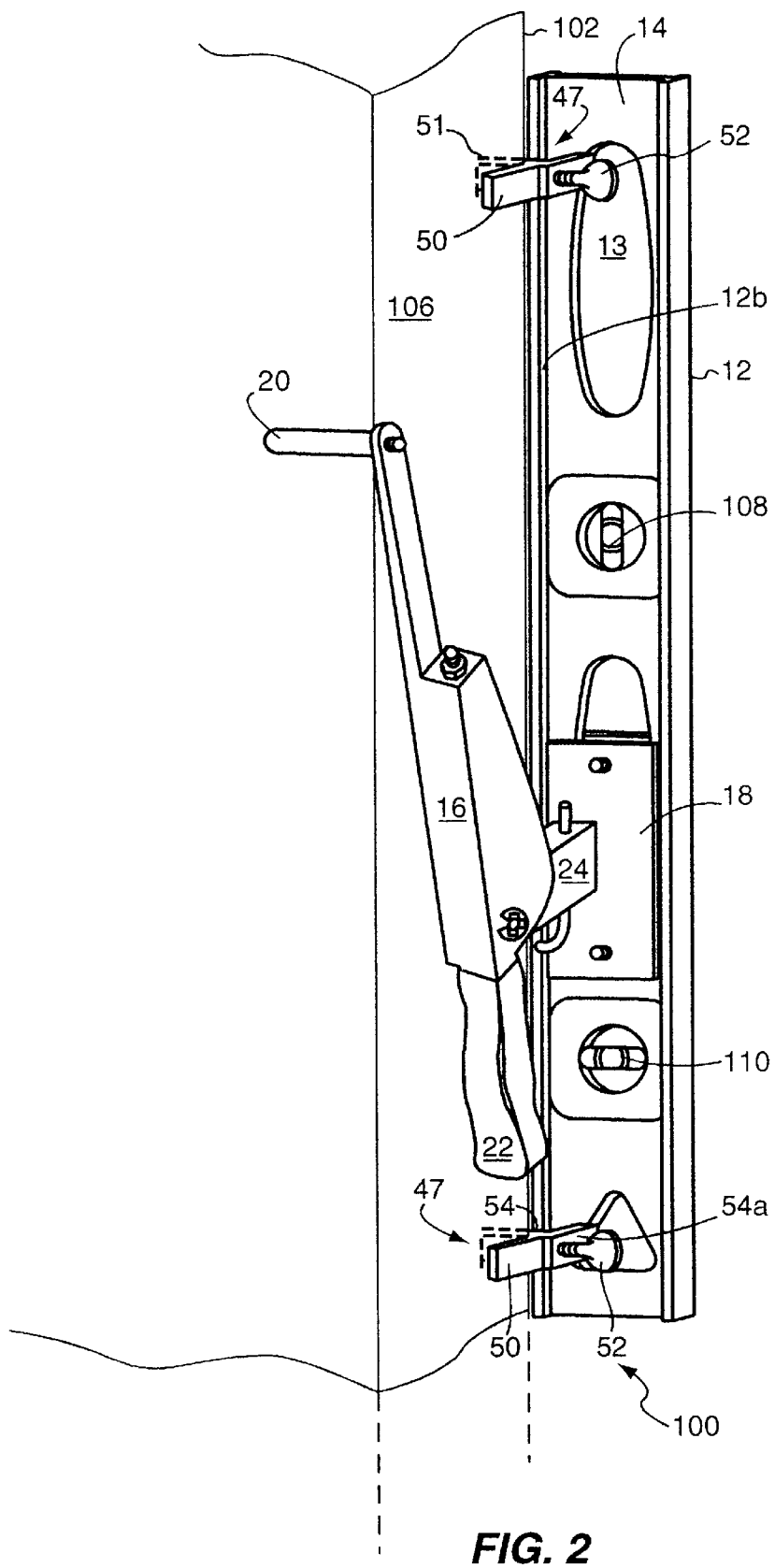
FIG. 2 depicts the level adaptor assembly of FIG. 1 positioned on a structural component.
Figure 3:
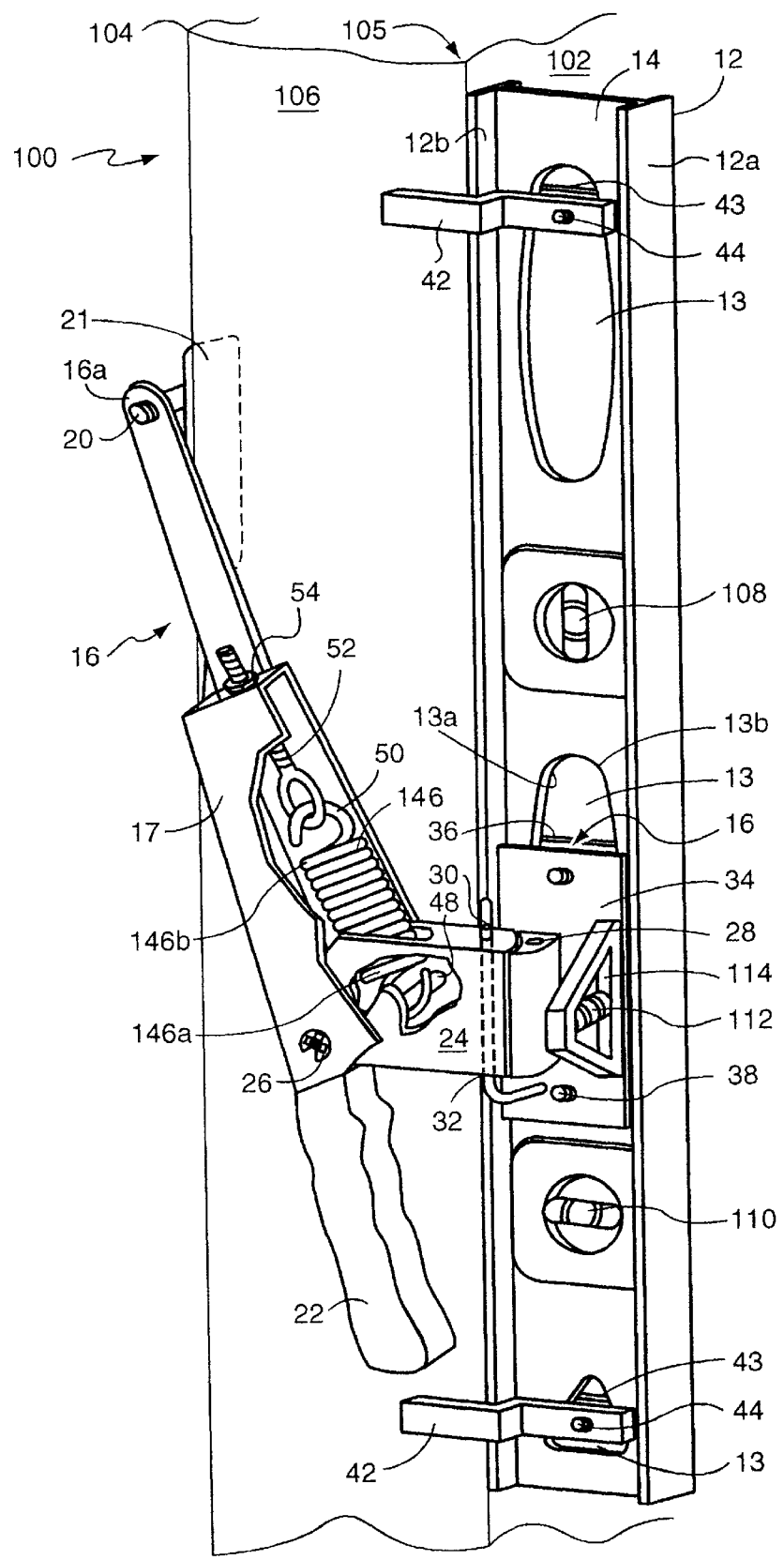
FIG. 3 depicts an alternative embodiment of the level adapter assembly.

The bracket 24 is preferably rotatably mounted on a mounting system 18, such that the bracket pivots about a pivot pin 28. A removable lock pin 30 inserted into drill hole 32 holds the bracket 24 against undesired pivotal movement. The bracket 24 remains perpendicular to the mounting system 18 when the assembly 10 is used to hold the face 14 of the level against or parallel to a front surface 102 of a door 100, as depicted in FIG. 2. In this position the level 12 is used to orient the end surface 106 of the door vertically. With the assembly in this configuration, the level may also be positioned horizontally on the door, to orient the front surface of the door horizontally. When the pivotable bracket 24 is rotated 90°, the assembly holds a side 12b of the level against the front surface 102 of the door 100, as depicted in FIG. 3. In this position the level 12 is used to vertically orient the front surface 102 of the door. The same configuration can be used to clamp the level horizontally to the front surface of the door, in order to orient that surface horizontally.

Referring again to FIG. 1, the mounting mechanism 18 consists of a base plate 34 that rests on the top face 14 of the level 12, and a mounting plate 36 that rests on an opposite face 15 of the level. Mounting screws 38 extend through threaded holes in the mounting plate 36, through a hole 13 that is in the center of the level 12 and through threaded holes 41 in the base plate 34, to hold the two plates 34 and 36 to either face of the level. The base plate 38 should be wide enough to extend beyond both edges 13a and 13b (depicted in more detail in FIG. 2) of the hole 13. Further, the plate 34 must be sized to fit between the raised sides 12a and 12b of the level.

The assembly 10 also includes two or more detachable side brackets 46. Each of the side bracket 46 screws onto the level through a hole 13 at one of the ends of the level. A screw 48, which screws into a threaded hole 46a in the bracket, extends through an associated mounting strip 49 on the opposite face 15 of the level 12, to hold the bracket 46 in place.

The side bracket 46 includes a tab 50 that extends outwardly from the side 12b of the level 12, in parallel with the face 14 of the level. Another tab 51 extends upwardly from the level, in parallel with the side 12b.

An alternative side bracket 47 is depicted in FIG. 2. This side bracket 47 includes a clip 54 that has two parallel legs 54a, and 54b (not shown) that extend, respectively, downwardly along the inner and outer faces of the side 12b of the level. The bracket 47 is held in place by a thumb screw 52, which screws into the leg 54a of the clip 54 that extends along the inner face of the side 12b of the level. The thumb screw thus holds the other leg 54b (not shown) against the outer face of the side 12b of the level. Like the side bracket 46 depicted in FIG. 1, the side bracket 47 includes tabs 50 and 51 that extend, respectively, outwardly and upwardly from the side 12b of the level.

Referring still to FIG. 2, the system 8 is attached to the door 100, such that the surface 14 of the level 12 is parallel to the front surface 102 of the door. The gripper bar 20 at the end of the spring-loaded arm 16 engages the back surface 104 of the door and holds the tabs 49 of the side brackets 46 against the front surface 102 of the door 100. The tabs 49 and the gripper bar 20 thus clamp around the end of the door 100, to hold the attached level in the desired position. The tabs 50 of the side brackets 46 contact the end surface 106 of the door, and ensure that the level remains parallel to the edge 105 of the door.

The level 12 extends beyond the end 106 of the door, so that the user can see the bubble windows 108, 110 as he or she adjusts the orientation of the end surface 106 of the door.

Figure 4:
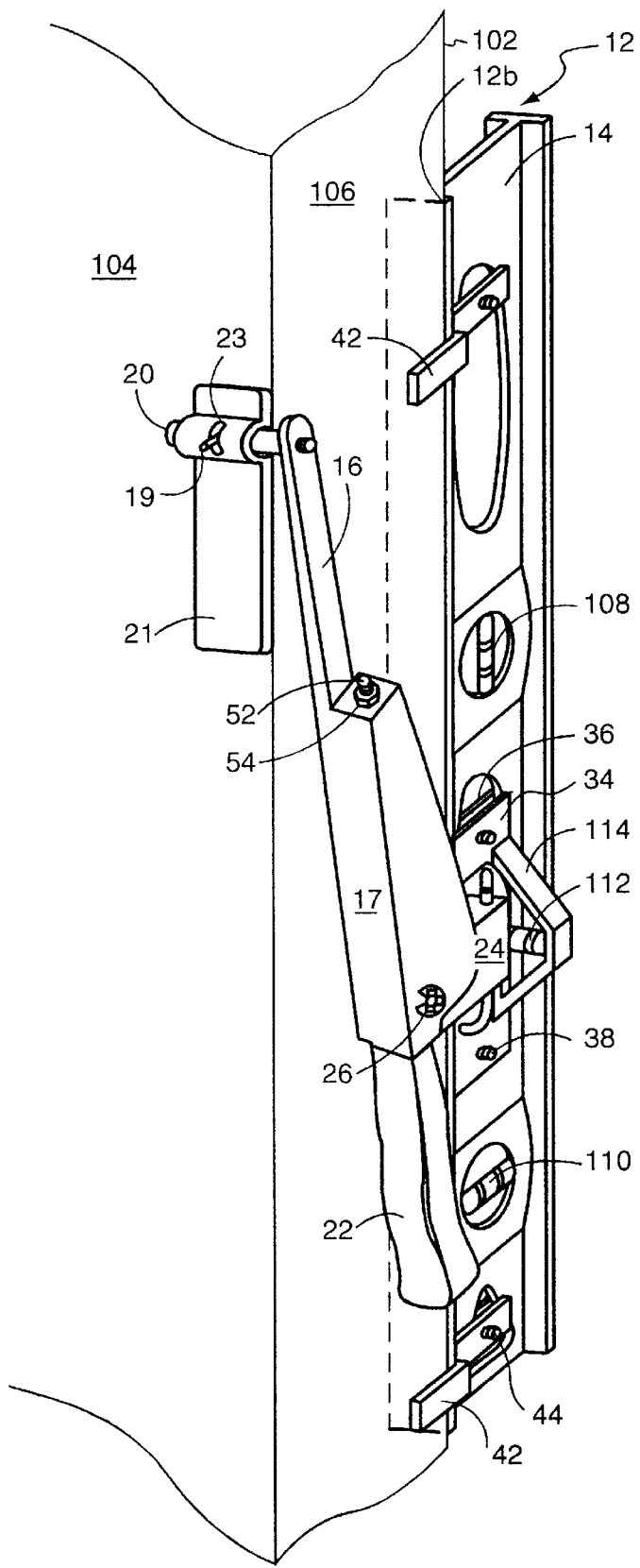
FIG. 4 depicts a different view of the assembly of assembly of FIG. 3.

FIGS. 3 and 4 depict an alternative configuration of the system in which the side 12b of the level 12 is held against the front surface 102 of the door by the spring-loaded arm 16. The bracket 24 is at a 90° angle relative to the base plate 34, and is locked in this position by the lock pin 30. The gripper bar 20 engages the back surface 104 of the door.

A gripper plate 21 (shown in phantom) is rotatably attached to the gripper bar 20. The gripper plate 21 provides a relatively large area over which is spread the force produced in the gripper bar in response to the tension in the spring 146. The rotatable gripper plate 21 also provides a better grip on pipes and other rounded objects than does the gripper bar 20 alone.

The spring 146 is shown through a cut-away in the arm 16. One end 146a of the spring is attached, by a hook 48, to the pivot pin 26 about which the arm rotates. The other end 146b of the spring is attached, by a hook 50, to a tension adjustment screw 52. The adjustment screw 52 is tightened or loosened by screwing it into or out of a bolt 54. This, in turn, increases or decreases the tension in the spring 146.

The tension in the spring 146 is typically set so that the user can, with one hand, depress the handle 22 to open the arm 18 to fit around a desired structural component. In the example, the arm opens slightly wider than the thickness of the door. Further, the tension in the spring 146 must be set to hold the level 12 in place on the door when the handle 22 is released and the gripper bar and plate 20 and 21 engage the opposite surface of the door.

The system also preferably includes two or more angled brackets 42. Each angled bracket is mounted to the face 14 of the level by a screw 44 that extends through a hole 13 at the end of the level. The screw 44 screws into a mounting plate 43 that is positioned on the opposite face 15 of the level. A nut (not shown) holds the screw 44 in place.

The angled brackets 42 are shaped to extend along the surface 14 of the level, up one side 12b of the level, and then outwardly therefrom. When the level is positioned as depicted in FIG. 3, the angled brackets 42 contact the end surface 106 of the door 100. The brackets stabilize the level, and prevent any movement or rotation of it. The brackets thus ensure that level 12 remains parallel to the edge 105 of the door 100.

An optional additional bubble window 112 is attached to the base plate 34 by a bracket 114. This bracket holds the window 112 perpendicular to the baseplate 34, and thus the face 14 of the level. This additional bubble window 112 orients the end surface 106 of the door vertically, while at the same time the bubble windows in the level vertically orient the front surface 102 of the door. The additional bubble window 112 thus eliminates the need to position the level in parallel with the front surface of the door, as depicted in FIG. 2. Accordingly, the angled brackets 42 need not include an upwardly extending tab.

The level adaptor assembly 10 of FIGS. 1–4 can be used to attach the level 12 to any type of rigid structural component, such as a wooden, metal or plastic partition or door, a brick or concrete block, a glass partition, door or window, and so forth. Further, there are no special attachments required to mount the level to rounded surfaces, such as to pipes, pillars, posts and so forth, as are required with prior known level holders. The assembly 10 is compact, and does not prevent the level from being used for other tasks, such as a straight edge, as do other prior known holders.

The assembly 10 may be used to store the level by clamping it to, for example, an installed door. This reduces the possibility that the level will be broken because of a fall or because it is stepped on. Prior known holders, which are cumbersome and bulky, can not as easily be used to store the level in this manner.

The length of the elongated arm 18 determines how large the opening between the level 12 and the gripper bar and/or plate 20 and 21, can be made to accommodate the end-width or radius of the partition, door, pipe and so forth. Thus, a longer arm 18 enables the assembly to be mounted on thicker, or larger-diameter components.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An adaptor assembly for positioning a level on a structural component, the assembly attaching to the level and contacting the structural component and including:
   A. mounting means for mounting the assembly to a top face of the level;
   B. an elongated member having a first end and a second end, the member being pivotally mounted on the mounting means to pivot about an axis of rotation;
   C. gripping means attached to the first end of the elongated member the gripping means being substantially parallel to the axis of rotation; and
   D. a spring attached between the elongated member and the mounting means for holding the gripping means against a surface of the structural component that is opposite a surface of the structural component to which the level is adjacent.

2. The adaptor assembly of claim 1, wherein the gripping means includes a bar with a first end and a second end, the second end of the bar being attached to the first end of the elongated member.

3. The adaptor assembly of claim 2, wherein the gripping means further includes a gripper plate that rotatably attaches to the second end of the bar.

4. The adaptor assembly of claim 1, wherein the mounting means includes:
   i. a base plate for attachment to the level, the base plate being positioned on the top face of the level and attaching to the elongated member;
   ii. a mounting plate for attachment to the level, the mounting plate being positioned opposite the base plate on a bottom face of the level, and
   iii. means for securing the base plate to the mounting plate, said means extending from the top face of the level to the bottom face of the level.

5. The adaptor assembly of claim 4, wherein the gripping means includes a bar with a first end and a second end, the second end of the bar being attached to the first end of the elongated member.

6. The adaptor assembly of claim 5, wherein the gripping means further includes a gripper plate that rotatably attaches to the second end of the bar.

7. The adapter assembly of claim 1, wherein the assembly further includes a bracket for attachment to the level and contacting of a surface of the structural component, the bracket attaching to a first end of the level and contacting the surface of the structural component to which the level is adjacent.

8. The adapter assembly of claim 7, wherein the assembly further includes a second bracket for attachment to the level and contacting of a surface of the structural component, the bracket attaching to a second end of the level and contacting the surface of the structural component to which the level is adjacent.

9. The adapter assembly of claim 1, wherein the assembly further includes a bracket for attachment to the level and contacting of a surface of the structural component, the bracket attaching to a first end of the level and contacting a surface of the structural component that is perpendicular to the surface to which the level is adjacent.

10. The adapter assembly of claim 9, wherein the assembly further includes a second bracket for attachment to the level and contacting of a surface of the structural component, the bracket attaching to a second end of the level and contacting a surface of the structural component that is perpendicular to the surface to which the level is adjacent.

11. The adapter assembly of claim 1, wherein the assembly further includes a bubble window mounted on the mounting means, said bubble window being oriented perpendicularly to the top face of the level.

12. An adaptor assembly for positioning a level on a structural component, the assembly attaching to the level and contacting the structural component and including:
   A. an elongated member having a first end and a second end;
   B. mounting means for mounting the assembly to a top face of the level;
   C. a pivotable bracket on which the elongated member is pivotally mounted to pivot about a first axis of rotation, the bracket being pivotally mounted on the mounting means to pivot about a second axis of rotation;
   D. gripping means attached to the first end of the elongated member the gripping means being substantially parallel to the first axis of rotation; and
   E. a spring attached between the elongated member and the housing for holding the gripping means against a surface of the structural component that is parallel to a surface of the structural component to which the level is adjacent.

13. The adaptor assembly of claim 12, wherein the gripping means includes a bar with a first end and a second end, the second end of the bar being attached to the first end of the elongated member.

14. The adaptor assembly of claim 13, wherein the gripping means further includes a gripper plate that rotatably attaches to the second end of the bar.

15. The adaptor assembly of claim 12, wherein the mounting means includes:
   i. a base plate for attachment to the level, the base plate being positioner on the top face of the level and attaching to the pivotable bracket;
   ii. a mounting plate for attachment to the level, the mounting plate being positioned on a bottom face of the level, and
   iii. means for securing the base plate to the mounting plate, said means extending from the top face of the level to the bottom face of the level.

16. The adaptor assembly of claim 15, wherein the gripping means includes a bar with a first end and a second end, the second end of the bar being attached to the first end of the elongated member.

17. The adaptor assembly of claim 16, wherein the gripping means further includes a gripper plate that rotatably attaches to the second end of the bar.

18. The adapter assembly of claim 12, wherein the assembly further includes a bracket for attachment to the level and contacting of the structural component, the bracket attaching to a first end of the level and contacting the surface of the structural component to which the level is adjacent.

19. The adapter assembly of claim 18, wherein the assembly further includes a second bracket for attachment to the level and contacting of the structural component, the bracket attaching to a second end of the level and contacting the surface of the structural component to which the level is adjacent.

20. The adapter assembly of claim 12, wherein the assembly further includes a bracket for attachment to the level and contacting of the structural component, the bracket attaching to a first end of the level and contacting a surface of the structural component that is perpendicular to the surface to which the level is adjacent.

21. The adapter assembly of claim 20, wherein the assembly further includes a second bracket for attachment to the level and contacting of the structural component, the bracket attaching to a second end of the level and contacting a surface of the structural component that is perpendicular to the surface to which the level is adjacent.

22. The adapter assembly of claim 12, wherein the assembly further includes a bubble window mounted on the mounting means, said bubble window being oriented perependicularly to a top face of the level.

23. An adaptor assembly for positioning a level on a structural component, the assembly attaching to the level and contacting the structural component and including:

A. an elongated member having a first end and a second end;

B. mounting means for mounting the assembly to a top face of the level;

C. a pivotable bracket on which the elongated member is pivotally mounted, the pivotable bracket being pivotally mounted on the mounting means;

D. gripping means attached to the first end of the elongated member;

E. a spring attached between the elongated member and the pivotable bracket for holding the gripping means against a surface of the structural component that is parallel to a surface against which the level rests; and F. a bubble window mounted on the mounting means, said bubble window being oriented perpendicularly to the top face of the level, wherein the gripping means is held by the spring in contact with a surface of the structural component that is parallel to the surface of the structural component to which the level is adjacent.

* * * * *